Patented May 9, 1944

2,348,226

UNITED STATES PATENT OFFICE 2,348,226

PROCESS FOR THE MANUFACTURE OF p-NITROARYL-DISULPHIMIDES

Erik Schirm, Dessau, Germany, assignor, by mesne assignments, to The Hydronaphthene Corporation, Wilmington, Del., a corporation of Delaware No Drawing. Application September 12, 1940, Serial No. 356,507. In Germany September 12, 1939

6 Claims. (Cl. 260—397.7)

The present invention relates to a process for the manufacture of p-nitroaryl-disulphimides. It is known, that the alkali salts of aryl sulphamides can be converted into diaryl sulphimides with aryl sulphonic acid chlorides either in the presence or absence of organic diluents free of hydroxyl groups. However, in attempting to extend this reaction to aryl sulphamides containing a nitro group in para-position to the sulphamide group the conversion is not practicable.

Now it has been found that organic sulphonic acid halides and their substitution products can be condensed with a good yield to the corresponding disulphimides by utilizing p-nitroaryl-sulphamides containing at least one hydrogen atom on the amide-nitrogen, provided the conversion is carried out in an aqueous alkaline medium.

Though it is known that sulphochlorides can be condensed with sulphimides in an aqueous medium and in the presence of alkaline agents to produce sulphimide, such a reaction could hitherto never be performed with p-nitroaryl-sulphamides. It was rather improbable that these sulphamides would be able to react, as by the presence of the nitro group in the para-position the sulphamide group becomes more acid and less reactive, as it is proved by the tests in a water-free medium mentioned above.

If symmetrical p,p'-dinitro-diaryl-sulphimides are to be produced according to the present process it is not necessary to make the p-nitroaryl-sulphamides separately, but two mols of p-nitrosulphochloride may simply be reacted with one mol of ammonia or with the equivalent amount of any ammonium salt in the presence of alkali. The reaction temperature varies between 0° and 100° C. and in general between 20° and 50° C.

Example 1

In 2000 parts by weight of water 202 parts by weight of p-nitrobenzene-sulphamide are dissolved while adding 50 parts by weight of sodium hydroxide. The solution is cooled down to about 2° C., whereupon 172 parts by weight of n-butane sulphonic acid chloride, advantageously diluted with the same volume of acetone, are slowly stirred in at a temperature from 0° to 5° C. As soon as during the adding of the sulpho chloride the alkalinity of the solution begins to diminish some sodium lye is added. After the sulpho chloride is entirely introduced the stirring is continued at 0° to 5° C. for approximately half an hour, then it is warmed up to 50° C. while keeping the mixture alkaline eventually by a further addition of sodium lye. After a short stirring at 50° C. the solution is acidified with hydrochloric acid until a strongly Congo-acid reaction is attained and after cooling down the crystallinely separated p-nitrobenbene-n-butane-disulphimide is sucked off and dried. The yield varies from 80% to 85% of the theoretical.

Example 2

One-hundred and ninety parts by weight of p-toluol-sulphochloride are rubbed on together with about 120 to 150 parts of water to form a fine paste. Likewise, 202 parts by weight of p-nitrobenzene sulphamide and 50 parts by weight of sodium hydroxide are dissolved in 2000 parts of water. Into this solution the sulphochloride-paste is introduced while stirring, while the temperature is kept not considerably in excess of 30° C. As soon as the solution is but slightly alkaline some soda lye is added until even after a rather long stirring a distinctly alkaline reaction still persists (to this effect approximately an additional 40 parts by weight of sodium hydroxide are used up). Now the mixture is heated on the water bath until a clear solution is attained and the solution is filtered in the hot state from any matter rendering the solution turbid that may be present. The clear filtrate is cooled down and the sodium salt of the p-nitro-p'-methyl-dibenzene sulphimides crystallising in colourless small leaves is sucked off and dried. From the filtrate the small residue of the sulphimide may be separated in a free form by acidifying with hydrochloric acid. The total yield varies between 85% and 90% of the theoretical.

Example 3

Two-hundred and twenty-two parts by weight of p-nitrobenzene-sulphochloride are rubbed on together with 110 parts by weight of water to form a paste. This paste is introduced all at once at room-temperature into a solution of 26.5 parts by weight of ammonium chloride in 600 parts of water. Then in the course of several hours at 25° to 30° C. ten times the amount of normal soda lye is gradually stirred in permanently keeping the mixture distinctly alkaline until about half of the required amount of two mols is added. Then the temperature is raised to 40–50° C. and the adding of the alkali is continued till after some stirring no further diminution of the alkalinity is observed. Now the temperature is raised to 85-90° C. and if necessary, some soda lye is still added, the total consumption of which is to be about 10% more than the theoretical one. Finally a clear solution is obtained which is cooled in ice. The thus obtained crystalline mass is sucked off and dried. The yield of the raw sodium salt of the p,p'-dinitro-dibenzene-sulphimide amounts to 90% of the theory.

I claim:

1. A process for producing p-nitroaryl-sulphimides which comprises reacting a p-nitroaryl sulphonic acid amide unsubstituted on its amide nitrogen atom with an organic sulphonic acid halide in an aqueous solution while maintaining said solution in an alkaline condition thereby producing a p-nitroaryl disulphimide.

2. A process for producing p-nitroaryl-sulphimides which comprises reacting a p-nitroaryl sulphamide unsubstituted on its amide nitrogen atom with a p-nitroaryl sulphonic acid halide in an aqueous solution while maintaining said solution in an alkaline condition thereby producing a p,p'-nitroaryl sulphimide.

3. A process for producing p-nitroaryl-sulphimides which comprises reacting a p-nitroaryl sulphonic acid amide unsubstituted on its amide nitrogen atom with an aryl sulphonic acid halide in an aqueous solution while maintaining said solution in an alkaline condition.

4. A process for producing p-nitroaryl-sulphimides which comprises reacting a p-nitroaryl sulphonic acid amide unsubstituted on its amide nitrogen atom with an alkyl sulphonic acid halide in an aqueous solution while maintaining said solution in an alkaline condition thereby producing a p-nitroaryl disulphimide.

5. A process for producing a p-nitroaryl-sulphimide which comprises reacting p-nitrobenzene-sulphamide with n-butane sulphonic acid chloride in an aqueous solution while maintaining said solution in an alkaline condition thereby producing p-nitrobenzene-n-butane-sulphimide.

6. A process for producing a p-nitroaryl-sulphimide which comprises reacting p-nitrobenzene-sulphamide with p-toluol sulphonic acid chloride in an aqueous solution while maintaining said solution in an alkaline condition thereby producing p-nitro-p'-methyl-dibenzene-sulphimide.

ERIK SCHIRM.